United States Patent [19]

Cummings et al.

[11] Patent Number: 5,467,611
[45] Date of Patent: Nov. 21, 1995

[54] TWO PLATE TXV BLOCK CONNECTOR FOR AUTOMOTIVE A/C SYSTEM WITH COMMON BOLTS AND INDEPENDENTLY ATTACHABLE SIDES

[75] Inventors: Larry D. Cummings, Clarence; Kurt R. Mittlefehldt, Amherst, both of N.Y.

[73] Assignee: General Motors Corporation, Detroit, Mich.

[21] Appl. No.: 334,980

[22] Filed: Nov. 7, 1994

[51] Int. Cl.⁶ .................................................... F25D 19/00
[52] U.S. Cl. ........................ 62/299; 251/151; 285/137.1
[58] Field of Search ........................ 62/299; 285/137.1; 251/151

[56] References Cited

U.S. PATENT DOCUMENTS

| | | | |
|---|---|---|---|
| 3,869,153 | 3/1975 | De Vincent et al. | 285/137.1 |
| 4,342,421 | 8/1982 | Widdowson | 236/92 B |
| 4,468,054 | 8/1984 | Orth | 285/137.1 |
| 5,146,766 | 9/1992 | Martins | 62/298 |
| 5,169,178 | 12/1992 | Hunzinger | 285/137.1 X |
| 5,271,646 | 12/1993 | Allread et al. | 285/137.1 |
| 5,308,125 | 5/1994 | Anderson, Jr. | 285/349 |
| 5,345,103 | 10/1994 | Torrence et al. | 285/137.1 |
| 5,387,014 | 2/1995 | Chevallier | 285/137.1 X |

OTHER PUBLICATIONS

Various Production TXV Block Connectors—13 pages.

*Primary Examiner*—William E. Tapolcai
*Attorney, Agent, or Firm*—Patrick M. Griffin

[57] ABSTRACT

A two plate, TXV block type of connector for an automotive air conditioning system evaporator improves the security and serviceability of the connection through the use of common bolts specially designed to cooperate with matching bolt passages through the TXV valve block. The evaporator side anchor plate threads to one end of the bolts first, and is pulled tight to one side of the block as enlarged flanges on the bolts are concurrently pulled tight against a recessed shoulder in the bolt passage. Matching conical shapes on the bolt flange and bolt passage shoulder, coupled with a radial clearance between the rest of the bolt and the bolt passage, self center the bolt and compensates for any initial misalignment. The bolts protruded enough to allow the second plate to be attached, or removed later, independently, with nuts that are threaded on from the same direction.

3 Claims, 6 Drawing Sheets

TWO PLATE TXV BLOCK CONNECTOR FOR AUTOMOTIVE A/C SYSTEM WITH COMMON BOLTS AND INDEPENDENTLY ATTACHABLE SIDES

This invention relates to automotive air conditioning systems in general, and specifically to a two sided block connector for attaching and detaching two pairs of lines independently to two sides of the block with a common bolt or bolts.

BACKGROUND OF THE INVENTION

In automotive air conditioning systems, a compressor receives low pressure from an evaporator, compresses it to a higher pressure, and sends it back to the evaporator, after it first passes through a condenser, where it is cooled and liquified. After leaving the condenser, the high pressure, liquified refrigerant is first passed through an expansion valve under high pressure and at medium temperature. The expansion valve does as its name suggests, expanding the liquid refrigerant and thereby lowering its pressure and temperature. The expanded refrigerant enters the evaporator and boils to absorb the heat from vehicle cabin air blown over it. Expansion valves may be nothing more than a fixed orifice. In some applications, however, especially those with fixed displacement compressors, it is necessary to use a thermostatic expansion valve, generally referred to as a TXV, for increased efficiency. A TXV responds to the pressure and temperature of the refrigerant entering and leaving the evaporator, so physical proximity to the evaporator inlet and outlet lines is helpful.

The lines to and from the compressor, condenser and evaporator all have to be fluidly connected when the car is assembled, and it is desirable that those connections be capable of being easily detached, as opposed to a permanent weld or the like. This assists in later servicing, as well as in leak testing the various components individually. However, it is necessary that all connections be tightly sealed. Since the TXV must respond to evaporator outlet and inlet conditions, the block that contains the valve internal components provides a convenient structure within which to incorporate the connectors that join the evaporator lines to the rest of the system. Often, threaded hose fittings have been used, one at the end of each line to be connected, which are threaded into or onto the block. An example can be seen in co assigned U.S. Pat. No. 4,342,421. These have the disadvantage of requiring a separate installation operation for each line, done with a wrench that swings over a wide arc perpendicular to the line. There is less and less underhood room available for such installation operations. Often, two of the lines run perpendicular to each other, which requires even more space. Other designs use a separate bolt to connect each of the four lines, which bolts are oriented parallel to the lines. Such bolts can be attached with a power socket driver that does not swing wide of the line, but four separate bolts still require a significant installation time.

Other block connector designs reduce the number of installation operations by connecting at least two of the four lines simultaneously to the block, as a yoked pair held in position by an anchor plate. The plate is pulled tight to the side of the block with a threaded bolt or pair of bolts. In one design, only the compressor and condenser lines are attached by an anchor plate, while the evaporator lines are permanently brazed into the other side of the block. As noted, permanent connections are undesirable because they cannot be disassembled. In another design, only the evaporator lines are attached to the block by a bolt and anchor plate, while the compressor lines are still connected with separately installed threaded fittings. In designs where all four of the lines are connected in two pairs by two bolted on anchor plates, separate bolts are generally used for each plate. In one such two anchor plate design, short bolts attached from opposite sides of the block attach the two plates. Since block access from the evaporator side is often limited or difficult, other two plate designs run all the bolts from the compressor side of the block. In one example, a first anchor plate attaches the two evaporator lines using a pair of threaded bolts long enough to run all the way through the block, side to side, with the bolt heads inset into the block. Then, a second plate, holding the compressor-condenser lines, is attached by its own, single, shorter threaded bolt, thereby covering up the inset heads of the first two, longer bolts. This presents the obvious disadvantage of being unable to check on or tighten the first two bolts once the last anchor plate has been added. There are three bolts to potentially loosen, only one of which is easily accessible. The obvious expedient of using common threaded bolts to run through both plates and sandwich the block between, while it would make the heads of the bolts always accessible from the compressor side of the block, is undesirable. This would make it impossible to remove the compressor side anchor plate independently of the evaporator side anchor plate. Furthermore, bolts long enough to reach all the way through the block (and through both plates) would be subject to misalignment relative to the two plates' bolt holes.

SUMMARY OF THE INVENTION

The invention provides a two anchor plate, TXV block connector design in which common bolts, i.e., bolts used to connect both plates, are installed from the compressor side of the block, but remain fully accessible after installation of the compressor side anchor plate. Despite the use of common bolts, the compressor side anchor plate can be independently attached or removed. In addition, the bolt design provides for self alignment during installation.

In the embodiment disclosed, a pair of evaporator lines are fluidly connected to a pair of respective compressor lines across a TXV block by two anchor plates abutted against the opposed sides of the block. A pair of parallel, unthreaded bolt passages run through the block, side to side, with a stepped cylindrical shape, including a conical shoulder inset from the compressor side of the block. A pair of identical bolts, each threaded at both ends, fits through the bolt passages with a slight radial clearance, but for an intermediate bolt flange, which fits closely. Each bolt flange has a conical shape that interfits with a bolt passage shoulder. The bolts are long enough to protrude from both sides of the block. The compressor side end of each bolt is also fluted at the tip so as to interfit with a power driver.

The evaporator side plate holds the evaporator lines in a yoked pair oriented properly to plug into one side of the block. The evaporator side plate has threaded bolt holes aligned with the bolts, and is attached first to the evaporator side of the block by inserting the bolts through the passages and into the bolt holes. This clamps the evaporator side plate to the block, and pulls the bolt flanges tightly against the bolt passage shoulders, leaving the other end of the bolts protruding rigidly from the other side of the block. The interfit of flange to matching conical shoulder also concentrically aligns the bolts as they are tightened. The compressor side plate holds the compressor lines in a plug-in ready pair, just as the evaporator side plate, but has smooth bolt holes that fit freely over the protruding ends of the bolts. It is attached by separate nuts that thread over the protruding bolt ends and are tightened down to clamp it to the block. Thus, attaching the second plate does not block access to the first. In addition, the second plate can be removed and reattached without disturbing the first.

DESCRIPTION OF THE PREFERRED EMBODIMENT

These and other features of the invention will appear from the following written description, and from the drawings, in which.

Figure 9:
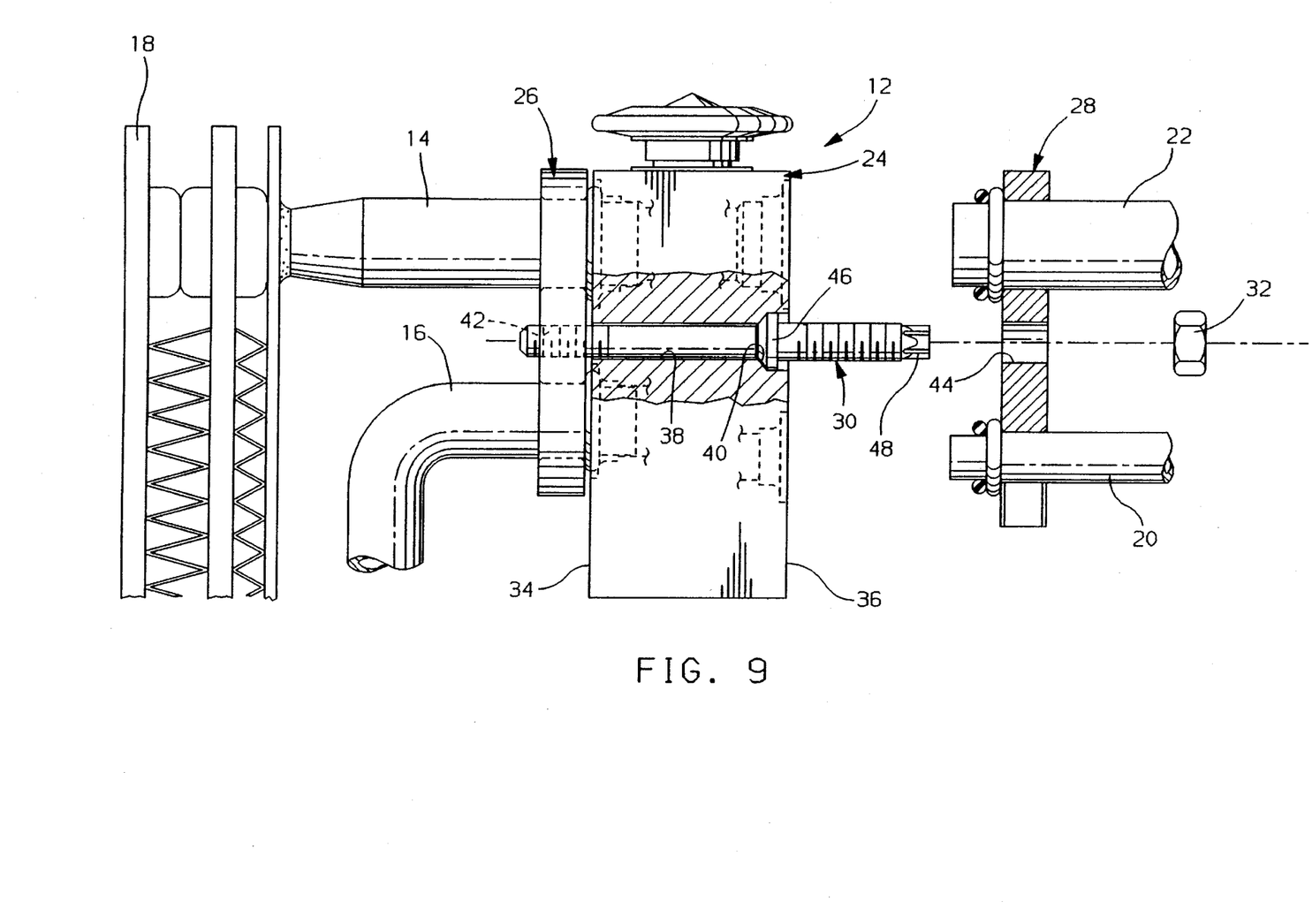
FIG. 9 shows the compressor side plate in the process of being attached.
Figure 10:
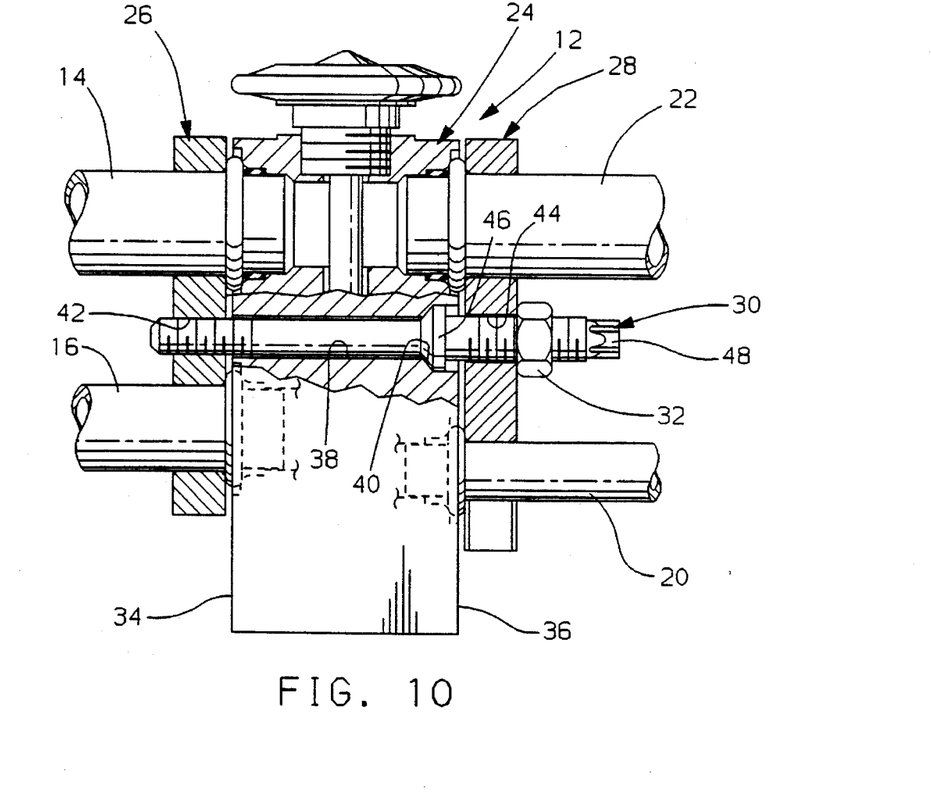
FIG. 10 shows the completed connector, with both plates and all lines connected.

Referring first to FIGS. 9 and 10, the connector of the invention, a preferred embodiment of which is indicated generally at 12, is intended to fluidly connect the outlet and inlet lines 14 and 16 of an evaporator 18 to a high pressure compressor outlet line 20 and low pressure compressor suction (inlet) line 22. The compressor outlet line 20 does not come directly from the compressor, passing through a condenser first, nor would the compressor suction line input directly to the compressor, passing first through an accumulator canister. Nevertheless, for purposes of the description here, the four lines may be referred to conveniently as evaporator and compressor lines. The four lines 14, 16 and 20, 22 plug into a TXV block, indicated generally at 24. Block 24 contains the internal components of a thermostatic expansion valve, not illustrated. Since the evaporator pressure and temperature are critical parameters to the operation of the valve, the block 24 is a logical and convenient structure with which to connect the lines, but the connecter and valve operation are essentially independent. The other components of the connector 12 include a first, evaporator side anchor plate, indicated generally at 26, a second, compressor side anchor plate, indicated generally at 28, a pair of bolts, one of which is indicted generally at 30, and a nut 32. Details of these components are described next.

Referring next to FIGS. 1 through 5, block 24 is a machined aluminum rectangular prism, with a flat evaporator side 34 and parallel compressor side surface 36, which are ported so as to receive the ends of the lines 14, 16 and 20, 22. A pair of parallel, unthreaded bolt passages 38 runs perpendicular to and through both block sides 34 and 36. The passages 38 are spaced far enough apart to miss the valve components internal to block 24. Each passage 38 is a stepped cylinder, with a conical shoulder 40 inset from the block's compressor side 36, which serves a purpose described below. Evaporator side anchor plate 26 securely holds the two evaporator lines 14, 16 in a parallel orientation, ready to plug into the block evaporator side 34. A pair of threaded bolt holes 42 in anchor plate 26 align with the bolt passages 38. Likewise, compressor side anchor plate 28 holds the two compressor lines 20, 22 in a yoked pair, with a pair of larger diameter, smooth walled bolt openings 44 that align with the block bolt passages 38. The block bolt passages 38, and anchor plate bolt holes 42 and bolt openings 44 cooperate with special features of the bolts 30, as described next.

Figure 1:
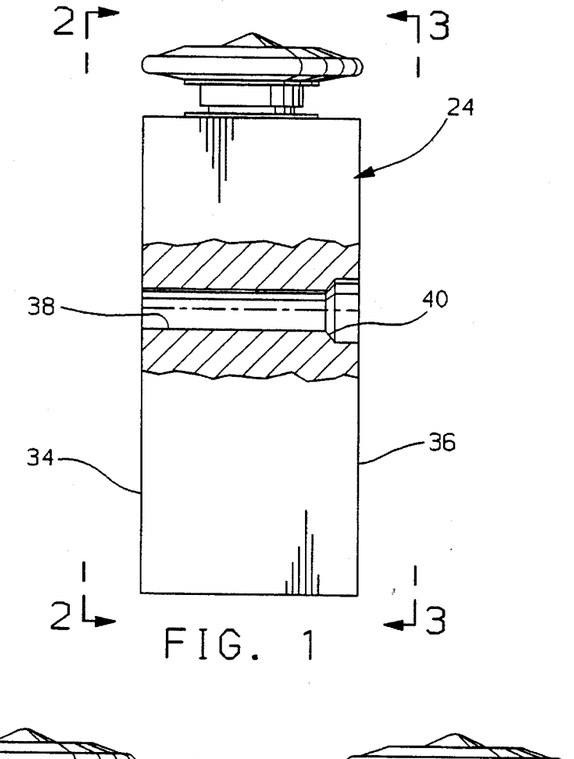
FIG. 1 is a view of the TXV block alone, broken away in the center to show one bolt passage.
Figure 2:
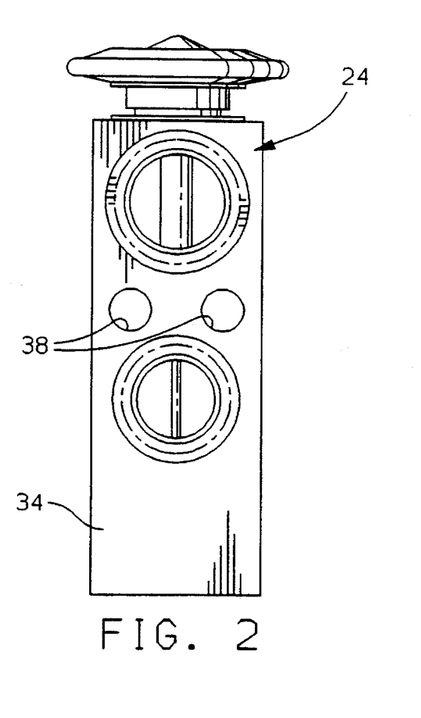
FIG. 2 is a view of the evaporator side of the block, from the perspective of line 2—2 of FIG. 1.
Figure 3:
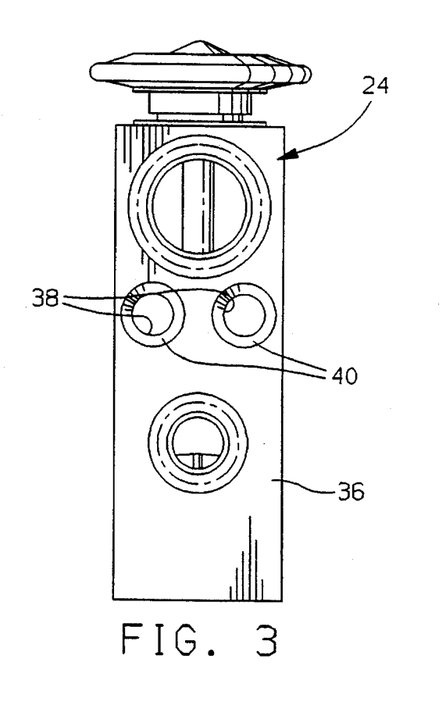
FIG. 3 is a view of the compressor side of the block, from the perspective of line 3—3 of FIG. 1.
Figure 4:
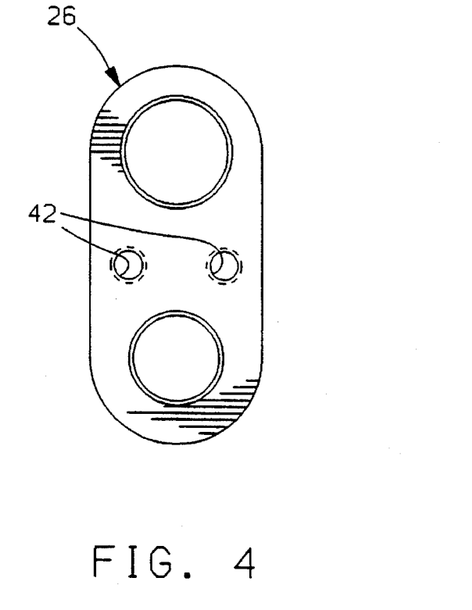
FIG. 4 is a view of the evaporator side anchor plate.
Figure 5:
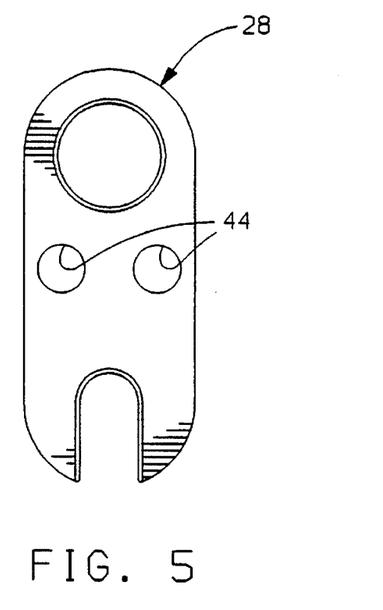
FIG. 5 is a view of the compressor side anchor plate.
Figure 6:
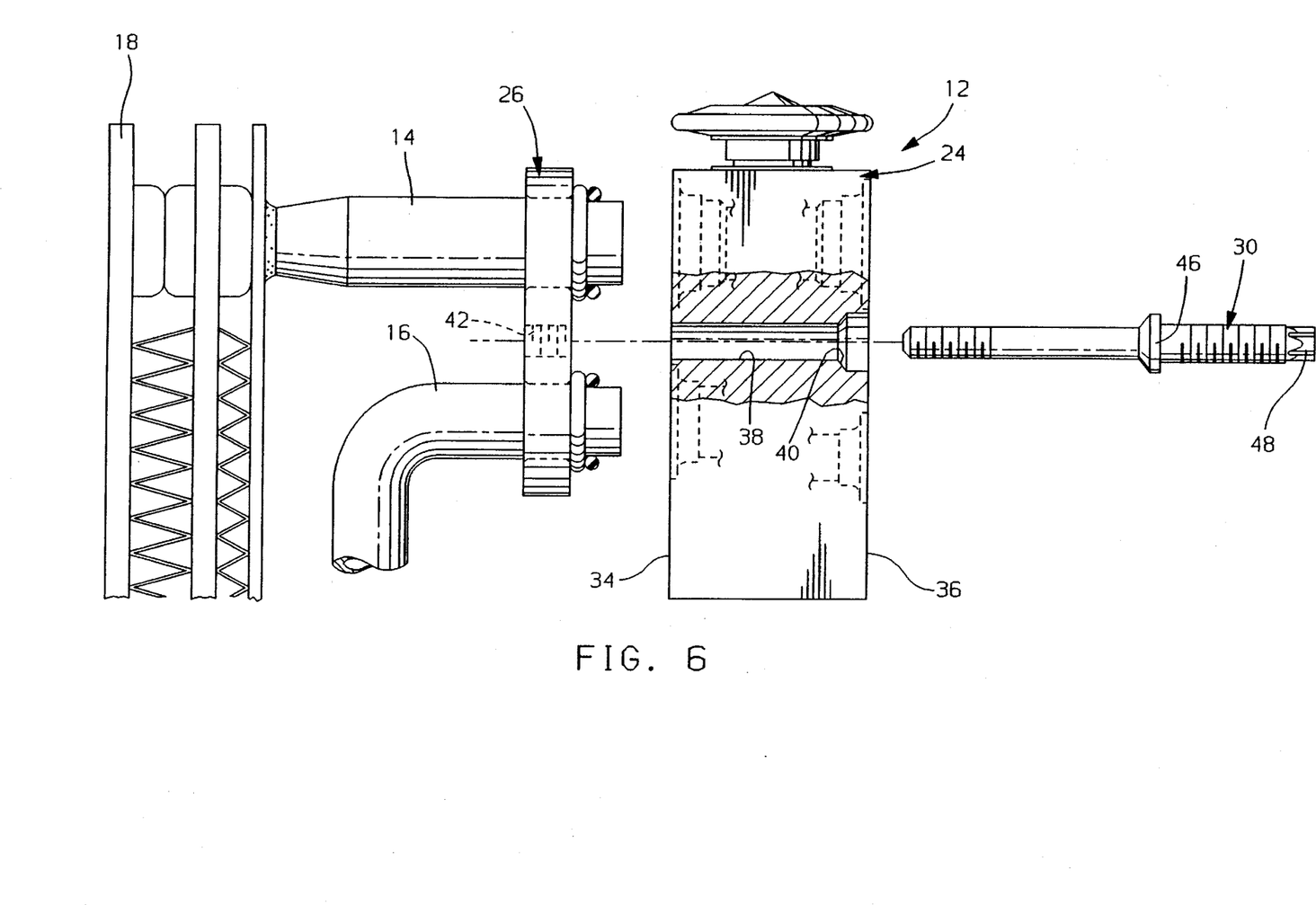
FIG. 6 is an exploded view of the connector exploded, shown in relation to the evaporator lines.
Figure 7:
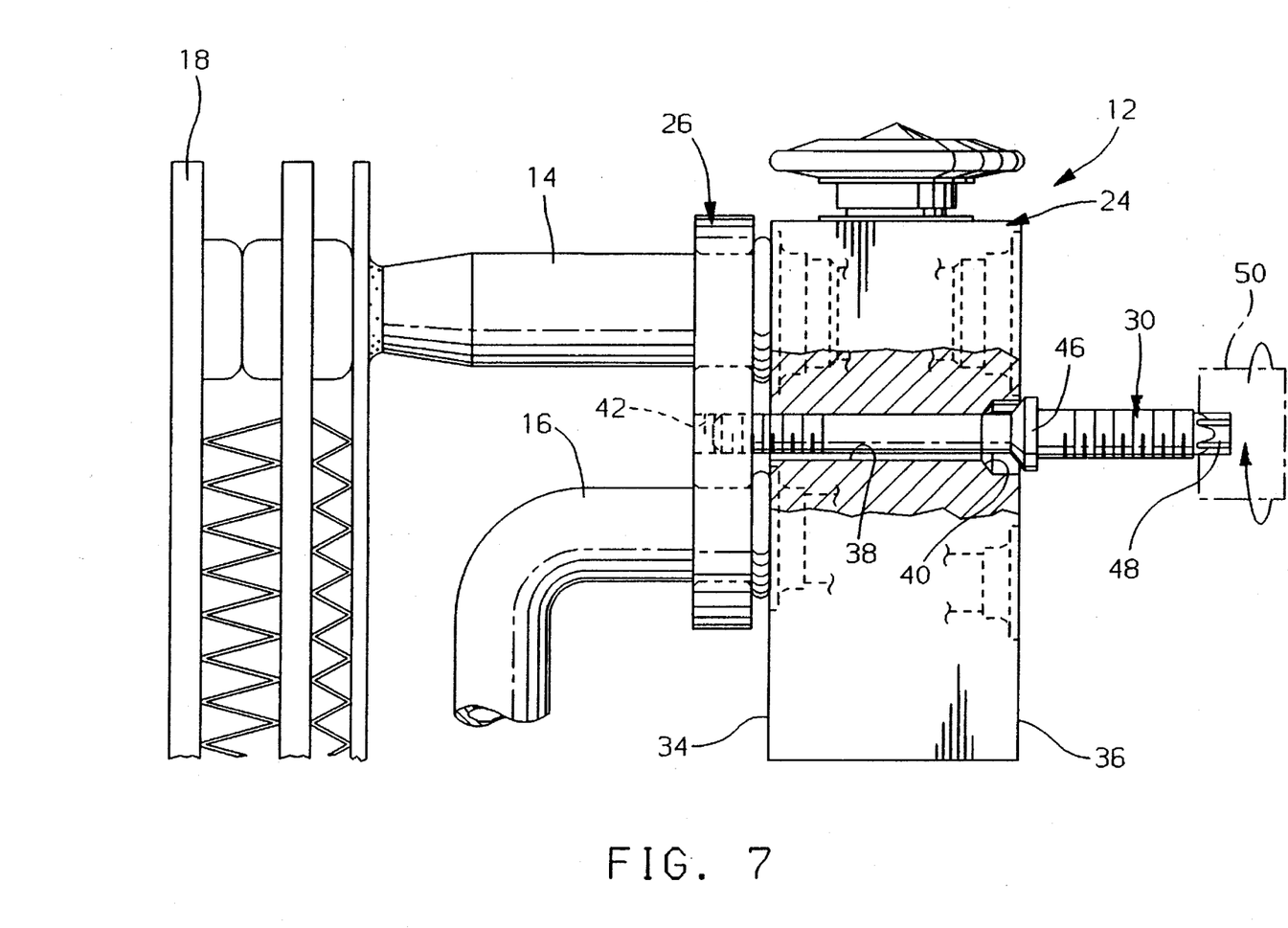
FIG. 7 is a view of the evaporator side plate in the process of being attached.
Figure 8:
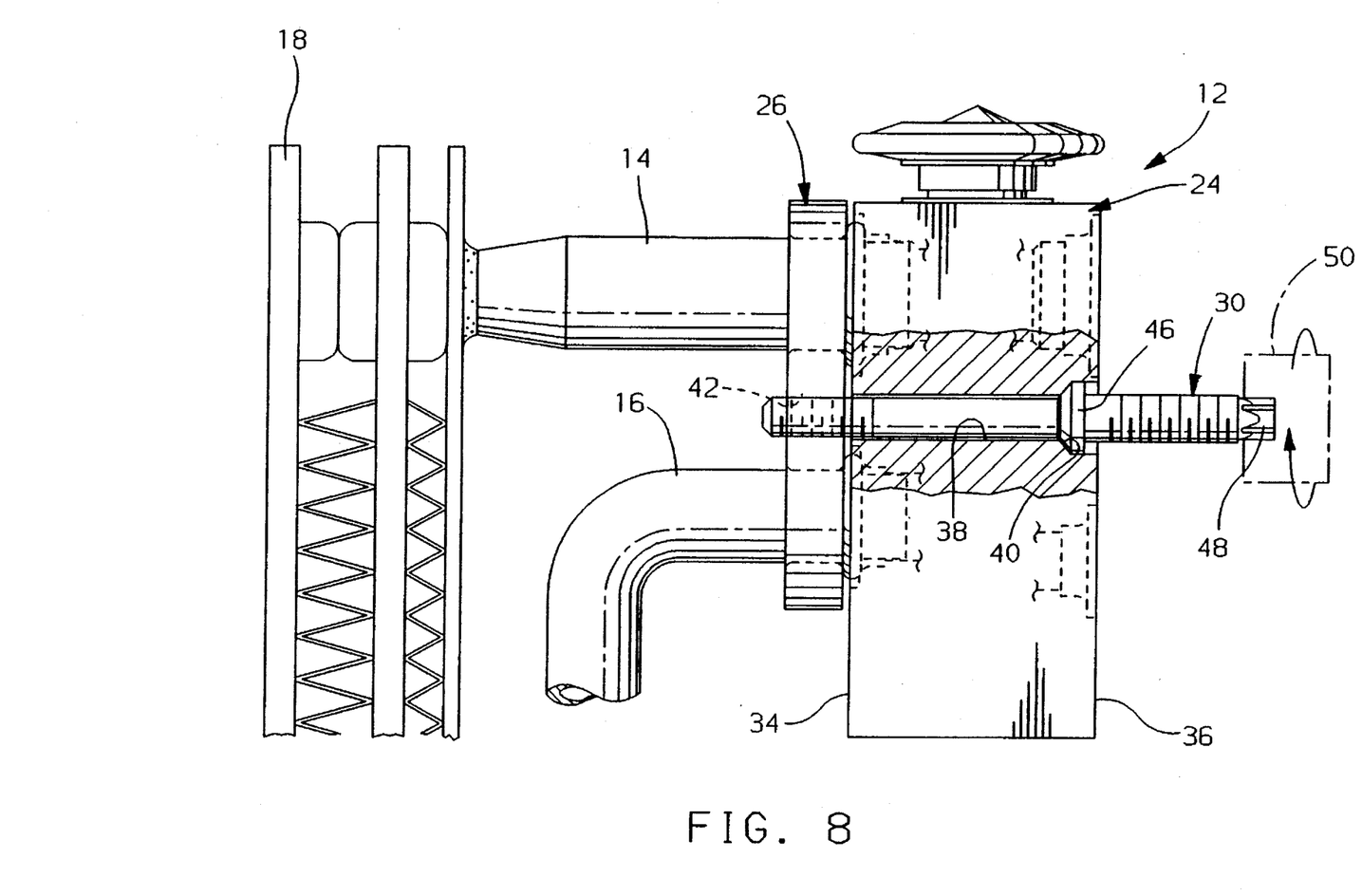
FIG. 8 is a view like FIG. 7, showing the evaporator side plate fully attached.

Referring next to FIGS. 6 and 7, each of the two identical bolts 30 is threaded at each end, with an intermediate conical flange 46, the shape of which matches the bolt passage conical shoulder 40. All of the length of bolt 30 is sized to fit through a bolt passage 38 with some radial clearance, but for the circular outermost edge of bolt flange 46, which makes a close radial fit. Bolt 30 is long enough such that, when its flange 46 is engaged with a bolt passage shoulder 40, each end protrudes from the block 24 by more than the thickness of a respective anchor plate 26 or 28. Finally, the tip 48 of bolt 30 closest to the flange 46 is fluted, so as to interfit with the socket of a standard power driver 50. This allows connector 12 to be assembled as follows. First, as seen in FIG. 7, evaporator side anchor plate 26 is abutted, or at least held close to, block evaporator side 34. The bolts 30 are turned by driver 50, engaging the far end of the bolts 30 in the threaded bolt holes 42. Access from the compressor side 36 of block 24 is unencumbered at this point. As illustrated in FIG. 7, it is very possible, initially, that the threaded bolt holes 42 would be slightly misaligned with the block's bolt passages 38, even if the evaporator side anchor plate 26 is abutted with the block side 34. Because of the radial clearance between bolt 30 and bolt passage 38 noted above, the bolt 30 can move eccentrically within the bolt passage 38 sufficiently to allow the threaded far end to catch in the threaded bolt holes 42. At that point, the bolt flange 46 has not yet entered the opposite, larger diameter end of the bolt passage 38, and so does not interfere with the eccentric motion of bolt 30. Then, as the bolt 30 is turned more and pulls itself farther in, the bolt conical flange 46 hits the circular edge of bolt passage 38, where it opens through block side 36, which eventually cams bolt 30 back toward a concentric relation to bolt passage 38. Referring next to FIGS. 7 and 8, continued turning of bolt 30 pulls the circular edge of bolt flange 46 into the larger diameter end of bolt passage 30 and inboard of block surface 36. Eventually, as shown in FIG. 8, the bolt conical flange 46 is drawn within and pulled tight to the matching shaped bolt passage shoulder 40. Simultaneously, evaporator side anchor plate 26 is tightly abutted with the block side 34 to seal the evaporator lines 14, 16 securely into block 24. Because of the close radial fit of the machined circular edges of the bolt flanges 46 within the bored cylindrical wall of the larger ends of the bolt passages 38, the free ends of the bolts 30 protrude from the block side 36 rigidly, and concentrically to the bolt passages 38. Concentricity and rigidity could not be as well assured if the bolt flanges 46 were not inset into the bolt passages 38, but merely abutted the block surface 36. At this point, if desired, the evaporator 18 can be taken to a work station, with the block 24 attached, as a subassembly. The protruding ends of the bolts 30 could then be used to attach a device to leak test the evaporator 18, without disturbing the evaporator side anchor plate 26.

Referring finally to FIGS. 9 and 10, to install evaporator 18, the compressor side anchor plate 28 and its line pair 20, 22 are pushed toward the block side 36 until the smooth walled bolt openings 44 pass freely over the protruding ends of the bolts 30. The bolt openings 44 need only be large enough in diameter to clear the threads on the protruding ends of the bolts 30, and need not be large enough to clear the bolt flanges 46, which are inset from block surface 36. Furthermore, the bolt openings 44 can be sized very close to the diameter of the protruding threaded ends of the bolts 30 without jeopardizing the ability to push fit the compressor side anchor plate 28 over them, because of the close concentricity that the bolt flanges 46 provide to the bolts 30. So, the inset of the enlarged bolt flanges 46 is doubly important. Once the compressor side anchor plate 28 has been pushed in place, but before the nuts 32 are added, the tightness of bolt 30 and the opposite side anchor plate 26 can still be checked and assured, if need be, since the bolt tips 48 are not covered up. Next as shown in FIG. 10, a nut 32 is threaded over each bolt tip 48 and down against the anchor plate 28, thereby clamping it tight against block side 36 and sealing the compressor line pair 20, 22 into block 24. The line pairs 14, 16 and 20, 22 are now fluidly connected. While tool access is not as clear for nut 32 as it is when bolt 30 is first installed, the installation location and direction of bolt 30 and nut 32 are basically the same, and can be done with the same or a similar tool. Turning nut 32 down will tend to turn bolt 30 so as to tighten it into anchor plate 26. Tightening nut 32 against compressor side anchor plate 28 will tend to pull both it and the opposite anchor plate 26 into tighter abutment against block 24, giving a secure, very rattle free connection. Should it be necessary to thread the nuts 32 off and remove anchor plate 28, it is a simple matter to check the tightness of the bolts 30 in opposite anchor plate 26, because the bolt tips 48 are accessible.

In conclusion, the connector 12 of the invention provides a solid and secure sealed connection, with a minimal number of well aligned parts, which is simple to assemble and disassemble. Tightness and seal integrity can be easily checked and assured at any time. Variations in the disclosed embodiment could be made. One bolt 30 and one bolt passage 38 could, theoretically, provide sufficient attachment force, if the vehicle vibrations were not too great. Such a single bolt 30 could not pass through the exact center of the block 24, however, since the inner workings of the valve are located there. It is more practical to have two bolts 30, spaced to either side of the center of block 24, as this misses the inner workings of the valve, and provides a much more stable, rattle free attachment. The bolt passage shoulder 40 could, theoretically, be located within the bolt passage 38 anywhere intermediate the block surfaces 34 and 36. However, it is an advantage that it be located proximate to the compressor side block surface 36, as it is easier to see and machine. If misalignment of the evaporator side anchor plate bolt holes 42 and the block bolt passages were 40 were not as significant a problem, because of a thinner block 24 or tighter tolerances, then the conical lead in surface on the bolt flange 46 and the matching conical shape of the bolt passage shoulder 40 would not be necessary, both of which surfaces could be simply made flat. However, it is relatively inexpensive to provide the matching conical surfaces, which prevents the bolt flange 46 from catching and hanging up on the block surface 36, and which provides the self centering lead in action illustrated in FIG. 7. While the bolt passage 38 needs to be stepped in diameter in order to allow the enlarged bolt flange 46 to be inset below the block surface 36, the bolt 30 itself, to either side of the flange 46, could be the same diameter. However, it is an advantage that the end of bolt 30 that protrudes through the compressor side plate 28 be larger in diameter, since that provides more thread surface for the nut 32. Therefore, it will be understood that it is not intended to limit the invention to just the embodiment disclosed.

The embodiments of the invention in which an exclusive property or privilege is claimed are defined as follows:

1. In an automotive air conditioning system, a connector for fluidly connecting a pair of evaporator lines to a pair of compressor lines, comprising, a block having opposed, first and second side surfaces adapted to receive and fluidly connect said pairs of lines, said block also having at least one bolt passage therethrough generally perpendicular to said block surfaces with a stepped cylindrical shape including a shoulder intermediate said first and second block side surfaces, a first plate abutable with said block first side surface, said plate being fixed to said evaporator lines so as to hold them at the proper orientation to be received within said block, said first plate also having a threaded opening alignable with said bolt passage, a second plate abutable with said block second side surface, said plate being fixed to said compressor lines so as to hold them at the proper orientation to be received within said block, said second plate also having a smooth opening alignable with said bolt passage, a bolt receivable through said block with an intermediate flange abutable with said bolt passage shoulder and two threaded ends, a first threaded end matched to said first plate threaded opening and a second threaded end receivable freely through said second plate smooth opening, said bolt having sufficient end to end length to protrude from said block side surfaces when said bolt flange is abutted with said bolt passage, and, a fastener threadable over said bolt second threaded end, whereby said evaporator lines may be joined to said block by first threading said bolt first end into said first plate, thereby abutting said first plate with said block first side surface and pulling said bolt flange tightly against said bolt passage shoulder, after which said compressor lines may be independently joined to said block, and thereby fluidly connected to said evaporator lines, by inserting said second plate opening over said bolt second threaded and threading said threaded fastener thereto, thereby abutting said second plate with said block second side surface.

2. In an automotive air conditioning system, a connector for fluidly connecting a pair of evaporator lines to a pair of compressor lines, comprising, a block having opposed, first and second side surfaces adapted to receive and fluidly connect said pairs of lines, said block also having at least one bolt passage therethrough generally perpendicular to said block surfaces with a stepped cylindrical shape including a conical shoulder intermediate said first and second block side surfaces, a first plate abutable with said block first side surface, said plate being fixed to said evaporator lines so as to hold them at the proper orientation to be received within said block, said first plate also having a threaded opening alignable with said bolt passage, a second plate abutable with said block second side surface, said plate being fixed to said compressor lines so as to hold them at the proper orientation to be received within said block, said second plate also having a smooth opening alignable with said bolt passage, a bolt receivable through said block with an intermediate conical flange abutable with said bolt passage shoulder and two threaded ends, a first threaded end matched to said first plate threaded opening and a second threaded end receivable freely through said second plate smooth opening, said bolt having sufficient end to end length to protrude from said block side surfaces when said bolt flange is abutted with said bolt passage, and, a fastener threadable over said bolt second threaded end, whereby said evaporator lines may be joined to said block by first threading said bolt first end into said first plate, thereby abutting said first plate with said block first side surface and drawing said conical bolt flange into said conical bolt passage shoulder to center said bolt, after which said compressor lines may be independently joined to said block, and thereby fluidly connected to said evaporator lines, by inserting said second plate opening over said bolt second threaded and threading said threaded fastener thereto, thereby abutting said second plate with said block second side surface.

3. In an automotive air conditioning system, a connector for fluidly connecting a pair of evaporator lines to a pair of compressor lines, comprising, a block having opposed, first and second side surfaces adapted to receive and fluidly connect said pairs of lines, said block also having at least one bolt passage therethrough generally perpendicular to said block surfaces with a stepped cylindrical shape including a conical shoulder proximate said second block side surfaces, a first plate abutable with said block first side surface, said plate being fixed to said evaporator lines so as to hold them at the proper orientation to be received within said block, said first plate also having a threaded opening alignable with said bolt passage, a second plate abutable with said block second side surface, said plate being fixed to said compressor lines so as to hold them at the proper orientation to be received within said block, said second plate also having a smooth opening alignable with said bolt passage, a bolt receivable through said block with an intermediate conical flange abutable with said bolt passage shoulder and two threaded ends, a first threaded end matched to said first plate threaded opening and a second threaded end receivable freely through said second plate smooth opening, said bolt having sufficient end to end length to protrude from said block side surfaces when said bolt flange is abutted with said bolt passage, and, a fastener threadable over said bolt second threaded end, whereby said evaporator lines may be joined to said block by first threading said bolt first end into said first plate, thereby abutting said first plate with said block first side surface and drawing said conical bolt flange into said conical bolt passage shoulder to center said bolt, after which said compressor lines may be independently joined to said block, and thereby fluidly connected to said evaporator lines, by inserting said second plate opening over said bolt second threaded and threading said threaded fastener thereto, thereby abutting said second plate with said block second side surface.

\* \* \* \* \*